United States Patent
Ozyegit et al.

(10) Patent No.: US 10,800,350 B2
(45) Date of Patent: Oct. 13, 2020

(54) ROOF INSULATION MATERIAL FOR VEHICLES AND PRODUCTION METHOD

(71) Applicant: PIMSA OTOMOTIV ANONIM SIRKETI, Cayirova, Kocaeli (TR)

(72) Inventors: Adnan Ozyegit, Kocaeli (TR); Cem Yigit, Kocaeli (TR); Emre Incekara, Kocaeli (TR); Emre Ozen, Kocaeli (TR); Koksal Ozben, Kocaeli (TR); Ramazan Tak, Kocaeli (TR); Suleyman Gur, Kocaeli (TR)

(73) Assignee: PIMSA OTOMOTIV ANONIM SIRKETI, Cayirova, Kocaeli (TR)

( * ) Notice: Subject to any disclaimer, the term of this patent is extended or adjusted under 35 U.S.C. 154(b) by 0 days.

(21) Appl. No.: 16/342,117

(22) PCT Filed: Jan. 25, 2018

(86) PCT No.: PCT/TR2018/050026
§ 371 (c)(1),
(2) Date: Apr. 15, 2019

(87) PCT Pub. No.: WO2019/009851
PCT Pub. Date: Jan. 10, 2019

(65) Prior Publication Data
US 2019/0256012 A1 Aug. 22, 2019

(30) Foreign Application Priority Data

Feb. 23, 2017 (TR) .................................. 2017/02785

(51) Int. Cl.
*B60R 13/02* (2006.01)
*B60R 13/08* (2006.01)
(Continued)

(52) U.S. Cl.
CPC .......... *B60R 13/0212* (2013.01); *B32B 27/40* (2013.01); *B60J 7/1291* (2013.01);
(Continued)

(58) Field of Classification Search
CPC .... B60R 13/08; B60R 13/0212; B60J 7/1291; B60J 7/1226; B62L 2031/3011; B32B 27/40; B29K 2075/00
(Continued)

(56) References Cited

FOREIGN PATENT DOCUMENTS

| CN | 102529840 A | 7/2012 |
|---|---|---|
| CN | 104723980 A | 6/2015 |

(Continued)

OTHER PUBLICATIONS

International Search Report for PCT/TR2018/050026.

*Primary Examiner* — Dennis H Pedder
(74) *Attorney, Agent, or Firm* — Egbert Law Offices, PLLC

(57) ABSTRACT

A roof insulation material used in convertible vehicles with soft top (fabric base, flexible) structure, the roof insulation material including: a bottom layer whose top surface is formed of woven felt coated with foil or thermoplastic polyurethane; a top layer which is formed of woven felt, and which is located on the bottom layer and is connected to the bottom layer; and polyurethane foam which corresponds to the profiles forming the roof structure when the roof structure is opened or closed, when located on the roof of the vehicle along with its side parts and which is located between the bottom layer and the top layer, except for the parts that contact said profiles.

3 Claims, 2 Drawing Sheets

(51) Int. Cl.
 B32B 27/40 (2006.01)
 B60J 7/12 (2006.01)
(52) U.S. Cl.
 CPC .......... B60R 13/08 (2013.01); *B32B 2250/02* (2013.01); *B32B 2375/00* (2013.01)
(58) Field of Classification Search
 USPC .................................................. 296/107.06
 See application file for complete search history.

(56) References Cited

FOREIGN PATENT DOCUMENTS

JP H04123949 A 4/1992
 WO 0154949 A1 8/2001

ROOF INSULATION MATERIAL FOR VEHICLES AND PRODUCTION METHOD

TECHNICAL FIELD

The invention is related to the roof structure of the vehicles with convertible roof system in the automotive sector. The invention specifically relates to the roof insulation material which is used in the roof part of the convertible vehicles with soft top (fabric base, flexible) structure, and which is made of Polyurethane foam located between two felt layers, and to the production method of this material.

PRIOR ART

Today, hard top (metal base rigid) or soft top (fabric base, flexible) structures are used in convertible vehicles. In the soft top (fabric base, flexible) structures, the roof insulation material is made of a block foam located between two woven felt layers. The block foam which is located between two woven felt layers, is formed with form mold. Afterwards, the woven felts are welded to each other by applying heat. The obtained insulation material is cut in accordance with the roof form whom it will be used for.

Sound and heat insulations inside the vehicle, are important for the vehicles with soft top (fabric base, flexible) structures. Therefore, block foam is used in the prior art. However, the block foam performs under the desired cab internal sound performance level. Also, since the roof systems are opened and closed by folding in said vehicles, an easily shaped and detailed insulation material shall be used. In prior art, due to block foam being used as roof insulation material; detailed forms may not be created and empty space sections may not be obtained. This situation causes bad exterior appearances for the roof of convertible vehicles. In the prior art, due to using foam structure in the whole fabric, areas on the spina of the convertible roof system, and foam parts which is not dischargeable during production, affect the folding performance of the roof system negatively and also cause extra bumpy appearance from the external view. Because the block foam would not be formed in the desired size, it may not provide enough empty space for the laths located horizontally and form the metal structure of the convertible roof system, and it applies pressure upon these laths occurs. Therefore, the folding feature of the roof system and the external look of the roof are affected negatively. In addition, block foam has low density and may not form a skin in the area it is located.

As a result, due to the inconveniencies mentioned above, and the insufficiency of the existing solutions regarding the issue, an improvement in the technical field is needed.

BRIEF DESCRIPTION OF THE INVENTION

The present invention is related to a roof insulation material which fulfills the requirements mentioned above, which eliminates all the disadvantages and provides some additional advantages, and to its production method.

The primary goal of the invention is to prevent the external appearance of the roof structure to be negatively affected due to the insulation material in the convertible vehicles with soft top (fabric base, flexible) structure.

The invention aims to develop a roof insulation material which may be formed easily in the desired manner, to be used in the convertible vehicles with soft top (fabric base, flexible) structure.

An aim of the invention is to provide internal cabin sound insulation in the convertible vehicles with soft top (fabric base, flexible) structure.

The invention also aims to prevent the factors causing problems in the opening and closing movement of the roof in the convertible vehicles with soft top (fabric base, flexible) structure.

Another aim of the invention is to enable obtaining empty space areas with the form of dent, enabling the horizontally positioned laths forming the roof metal structure to be located, in the roof insulation material.

The invention aims to develop a roof insulation material which may be easily formed in the desired manner with polyurethane (PU) injection method and Pu mold, not composite (PU non-inclusive of glass or fibers etc.), to be used in convertible vehicles with soft top (fabric base, flexible) structure.

In order to obtain the goals mentioned above, the invention is a roof insulation material used in convertible vehicles with soft top (fabric base, flexible) structure and said roof insulation material comprises;
  a bottom layer which is made of woven felt whose top surface is covered with foil or thermoplastic Polyurethane,
  a top layer which is made of woven felt and is located on and connected to the bottom layer,
  a polyurethane foam which is located between the bottom and the top layers, except the side parts and the sections which correspond to the profiles forming the roof metal structure and the sections that are in contact with these profiles, when located on the vehicle roof, while the roof structure is closed In order to achieve the aims described above, the production method of the roof insulation material comprises the following steps;
  Injecting polyurethane foam to the top surface which is foil or thermoplastic polyurethane coated, of the bottom layer which is made of woven felt,
  locating the form mold onto the bottom layer, when the side parts of the roof insulation material and the roof insulation material are located on the roof of the vehicle and when the roof structure is opened or closed, except for the sections which correspond to the profiles forming the roof metal structure and the sections that are in contact with these profiles, in order to enable the polyurethane foam to be transmitted to the desired sections on the bottom layer,
  after the form mold is removed, locating the top layer onto the bottom layer where the polyurethane foam is injected and connecting the bottom layer and the top layer via heat,
  performing cutting in accordance with the internal form of the roof.

In order to achieve the goals of the invention, form mold comprises protrusions preventing the location of the polyurethane foam on the side parts of the roof insulation material and the profiles forming the roof metal structure and sections which correspond to these profiles when the roof insulation material is located on the vehicle roof and the roof structure is closed.

The structural and characteristical features of the invention along with all its advantages shall be understood more clearly with the figures provided below and the detailed description that refers to these figures. Therefore, an evaluation shall be made by taking these figures and the detailed description into account.

BRIEF DESCRIPTION OF DRAWINGS

It is not necessary that the figures are scaled and the details that are not required in order to understand the present invention may be ignored. In addition to that, elements which are majorly identical or which have majorly identical functions are shown with the same number.

DESCRIPTION OF THE PART REFERENCES

Figure 1:
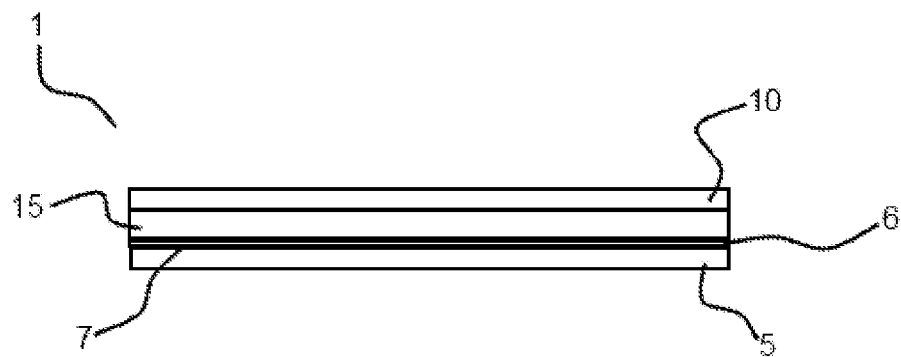
FIG. 1: It is the sectional view showing the internal structure of the roof insulation material of the invention.

1. Roof insulation material
5. Bottom layer
6. Foil or thermoplastic Polyurethane
7. Top surface
10. Top layer
15. Polyurethane foam
30. Form mold
35. Protrusion
40. Side
50. Section without Polyurethane foam

DETAILED DESCRIPTION OF THE INVENTION

In this detailed description a roof insulation material (1) subject of the invention, for the convertible vehicles, and its production method are described while not limiting in any manner, in order for the issue to be better understood.

The invention relates to the roof insulation material (1) which is used in convertible vehicles with soft top (fabric base, flexible) structure. In FIG. 1 a sectional view showing the internal structure of the roof insulation material (1) subject of the invention, is provided. Said roof insulation material (1), generally comprises respectively, a bottom layer (5) which is made of woven felt, whose top surface (7) is coated with foil or thermoplastic polyurethane (6), a top layer (10) which is made of woven felt, and is located on and is connected to the Bottom layer (5), a polyurethane foam (15) which is located between the bottom layer (5) and the top layer (10), except the side (40) parts and the sections which correspond to the profiles forming the roof metal structure and the sections that are in contact with these profiles, when located on the vehicle roof, when the roof structure is closed.

The production method of the roof insulation material (1) subject of said invention, which is mentioned above, generally comprises the steps of;

injecting polyurethane foam (15) to the top surface (7) which may be foil or thermoplastic Polyurethane (6) coated, of the bottom layer (5) which is made of woven felt, locating the form mold (30) on the bottom layer (5) when the side (40) parts of the roof insulation material (1) and the roof insulation material (1) are located on the roof of the vehicle, and when the roof structure is opened or closed, except for the sections which correspond to the profiles forming the roof metal structure, and the sections that are in contact with these profiles, in order to enable the polyurethane foam (15) to be transmitted to the desired sections on the bottom layer (5), after the form mold (30) is removed locating the top layer (10) on the bottom layer (5) where polyurethane foam (15) is injected and connecting the bottom layer (5) and the top layer (10) via heat, Performing cutting in accordance with the internal form of the roof.

Figure 2:
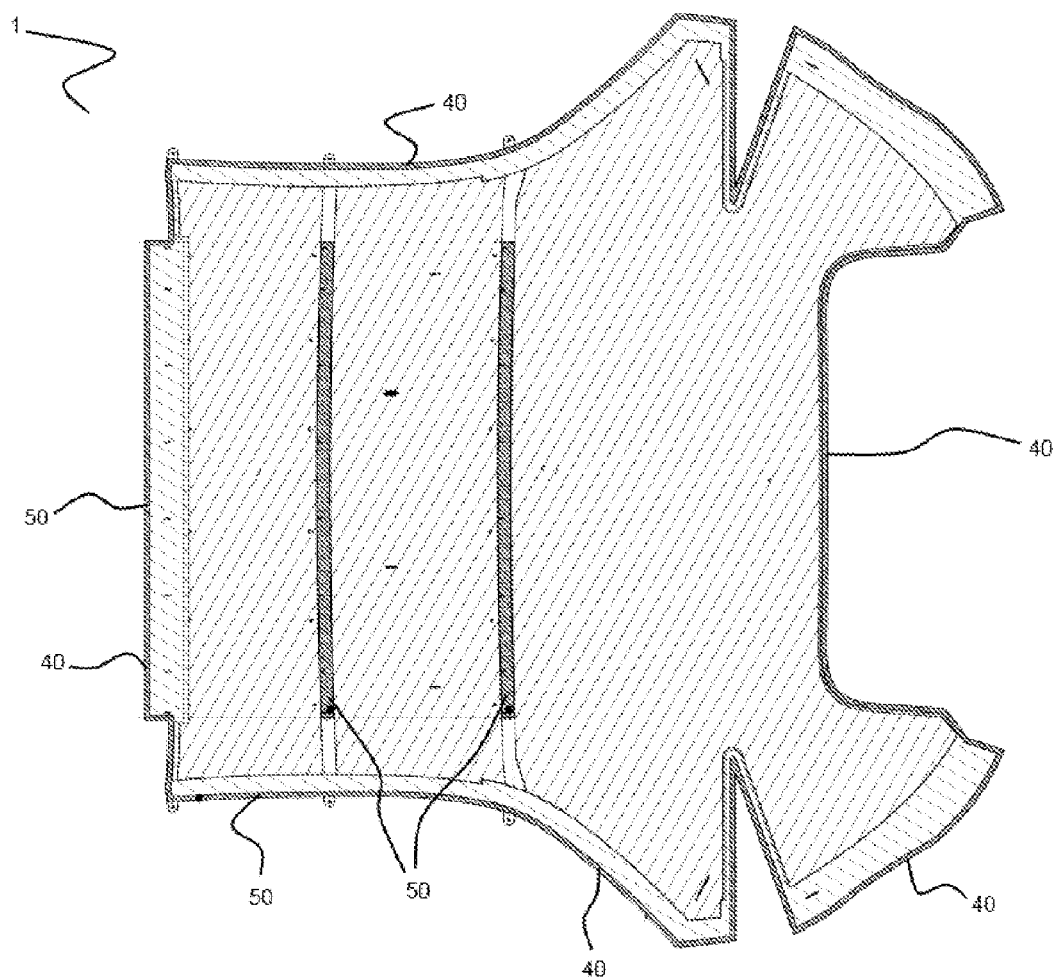
FIG. 2: It is the general view of the roof insulation material of the invention in a manner that it is cut according to the internal form of the roof.

In FIG. 2, the general view of the roof insulation material (1) subject of the invention, in a manner that it is cut according to the internal form of the roof, is provided.

The bottom layer (5) and the top layer (10) composing the roof insulation material (1) subject of the invention, are made of nonwoven woven felt. Top surface (7) of the woven felt forming the bottom layer (5), may be coated with foil or thermoplastic polyurethane (6). Therefore, leakage of the polyurethane foam (15) which is injected onto the bottom layer (5), may be prevented. The polyurethane foam (15) may insulate the sounds from out of the vehicle, due to its cavernous cell structure. In addition, it has a moldable feature. It may be formed according to other materials that it works together.

Figure 3:
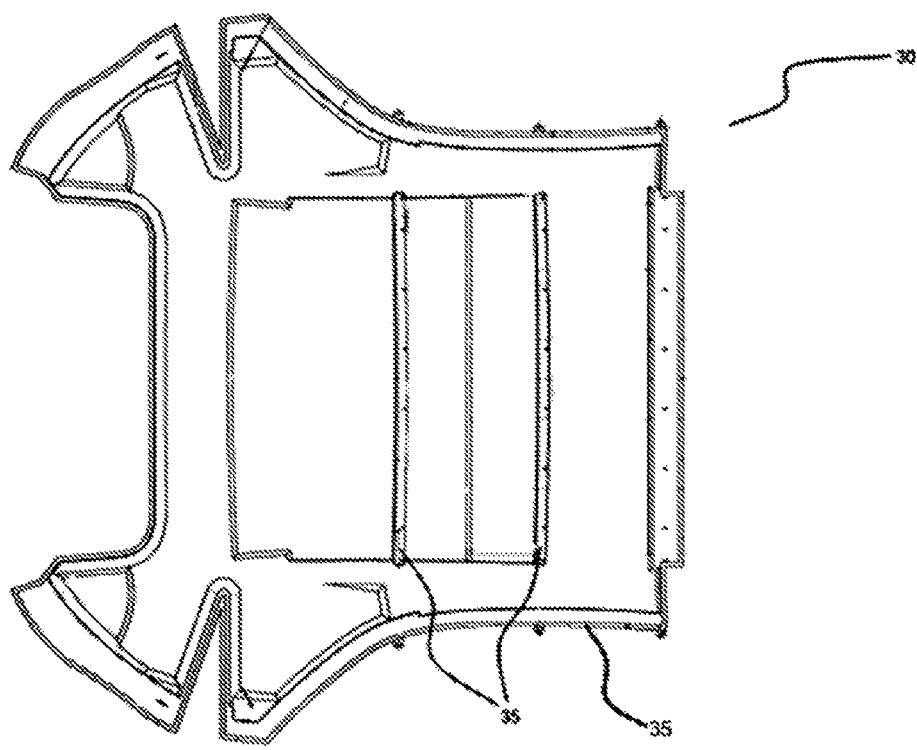
FIG. 3: It is the general view of the form mold which is used to obtain the roof insulation material of the invention.

The polyurethane foam (15) is poured by a robot on the foil or thermoplastic polyurethane (6) coated top surface (7) of the bottom layer (5) which is made of woven felt, in accordance with the course that is designed depending on the desired roof insulation material (1) form. In order to have the polyurethane foam (15) to spread to the desired areas on the bottom layer (5), form mold (30) is closed upon the bottom layer (5) with a clamp. There are protrusions (35) on the form mold (30), in order to have no polyurethane foam (15) or a very thin layer of polyurethane foam (15) on the side (40) sections of the roof insulation material (1) and the sections which correspond to the profiles forming the roof metal structure and the sections that are in contact with these profiles, when it is located on the vehicle roof and the roof structure is opened or closed. The polyurethane foam (15) is prevented from entering to the sections where these protrusions (35) contact to the bottom layer (5). Because of the protrusions (35) on the form mold (30), the polyurethane foam (15) is prevented from entering to the desired sections. Therefore, the sections (50) which do not comprise polyurethane foam (15), are obtained in the roof insulation material (1). The PU foam may be produced in highly complex structures, via form mold (30). After the form mold (30) is removed from top of the bottom layer (5), top layer (10) is located on the bottom layer (5). The bottom layer (5) and the top layer (10) are welded together by heating via the thermo welding machine. Afterwards, cutting is performed with a cutting frame according to the desired form and the final product roof insulation material (1) is obtained. In the FIG. 3, the general view of the form mold (30) which is used in producing the roof insulation material (1) subject of the invention, is provided.

The structure created as a result of polyurethane (PU) foam (15) injection, especially increases the performance of the sound insulation. In addition, it also contributes to the heat insulation. Since the polyurethane foam (15) injection is done in a mold, detailed forms may be created. Therefore, the empty spaces in the fabric convertible roof system may be completely filled and any visual inconveniences that may happen in the external appearance may be prevented. Because in the obtained roof insulation material (1) the sections that correspond to the backbone sections of said roof system, may be left empty with the protrusions (35) of the male sections in the form mold (30) or that they may be with very thin thickness, the roof system may be easily operated and the external appearance of the roof may not be affected negatively. In the roof insulation material (1), due to the sections without polyurethane foam (50), the system may be folded more easily and comfortably when the roof is opened and closed.

With the invention a roof insulation material (1) which may be easily formed in the desired manner with PU injection method and PU mold, is not composite (PU non-inclusive of glass or fibers etc.), to be used in convertible vehicles with soft top (fabric base, flexible) structure.

The invention claimed is:

1. A roof insulation material which is used in convertible vehicles with soft top (fabric base, flexible) structure, wherein; said roof insulation material comprises:
    a bottom layer which is made of woven felt, whose top surface is coated with foil or thermoplastic polyurethane;
    a top layer which is made of woven felt, which is located on the bottom layer and is connected to the bottom layer;
    a polyurethane foam which is located between the bottom layer and the top layer except the side parts and the sections which correspond to the profiles forming the roof metal structure and the sections that are in contact with these profiles, when located on the vehicle roof and the roof structure is closed.

2. The production method of the roof insulation material according to claim 1, wherein; it comprises the following process steps:
    injecting polyurethane foam to the top surface which is foil or thermoplastic polyurethane coated, of the bottom layer which is made of woven felt;
    locating the form mold on the bottom layer in order to enable the polyurethane foam to be transmitted to desired sections on the bottom layer;
    after the form mold is removed, locating the top layer on the bottom layer where polyurethane foam is injected, and connecting the bottom layer and the top layer via heat; and
    performing cutting in accordance with the internal form of the roof.

3. The method according to claim 2, wherein; said form mold comprises protrusions which prevent the polyurethane foam location on areas correspond to the profiles forming the roof metal structure and which contact to these profiles, when located on the side sections of the roof insulation material, and when the roof insulation material is located on the vehicle roof, when the roof structure is opened or closed.

* * * * *